United States Patent

Durling

[11] 4,043,351
[45] Aug. 23, 1977

[54] FLUID VALVE INCLUDING ELECTRICAL CIRCUIT CONTROL

[75] Inventor: Harold Durling, Elsie, Mich.

[73] Assignee: Midland-Ross Corporation, Cleveland, Ohio

[21] Appl. No.: 635,641

[22] Filed: Nov. 26, 1975

[51] Int. Cl.² .............................................. F16K 37/00
[52] U.S. Cl. ................................ 137/554; 137/624.27; 251/297; 251/359
[58] Field of Search ........................... 137/554, 487.5; 251/129, 130, 141, 297, 359, 321

[56] References Cited

U.S. PATENT DOCUMENTS

| | | | |
|---|---|---|---|
| 2,280,937 | 4/1942 | Thornhill et al. | 137/540 X |
| 2,682,891 | 7/1954 | Leslie | 251/359 X |
| 2,752,930 | 7/1956 | Stouder | 251/297 X |
| 3,093,158 | 6/1963 | Tennis | 137/624.27 |
| 3,199,523 | 8/1965 | McEathron | 137/87 |
| 3,355,140 | 11/1967 | Andersen | 251/129 X |
| 3,450,353 | 6/1969 | Eckert | 251/141 X |
| 3,455,536 | 7/1969 | Barker | 251/129 X |
| 3,627,257 | 12/1971 | Stanpfli | 251/129 |
| 3,820,560 | 6/1974 | Leemann | 137/495 X |
| 3,890,995 | 6/1975 | Miller et al. | 137/554 X |

FOREIGN PATENT DOCUMENTS

| 633,851 | 1/1962 | Canada | 137/554 |

Primary Examiner—William R. Cline
Attorney, Agent, or Firm—Woodrow W. Portz

[57] ABSTRACT

Disclosed below is a valve constructed with an electrical circuit extending through separable flow-control elements of the valve whereby the circuit may be opened by actual parting of the separable elements. For specific uses, the valve is characterized by structure permitting instant opening to full flow, high flow capacity, self-opening action, and latching mechanism for locking it in closed position.

6 Claims, 5 Drawing Figures

FLUID VALVE INCLUDING ELECTRICAL CIRCUIT CONTROL

BACKGROUND OF THE INVENTION

Federal regulations covering truck air brake systems require air flow capacity sufficient to pressurize the vehicle air brake chambers to 60 pounds per square inch (psi) within 0.30 second measured from the instant of brake actuation by a driver. Exhaustion of the chambers from 95 psi to 5 psi must occur within 0.60 second measured from the first movement of the vehicle brake control during brake release. While the vehicle manufacturer must consistently meet these requirements with a satisfactory combination of components, such as air control valves and connecting tubing, the air flow capacity of individual components must be known originally at the time of manufacture and will necessarily be re-examined by testing during actual service periods as normal maintenance procedure for maintaining vehicles on the highways. Air brake control valves that will be subject to periodic testing can be divided into three general types: mechanically actuated, pilot operated, and through valves. Examples of mechanically actuated valves include foot operated brake application valve, trailer hand control valve, dash mounted push-pull valves and others. Pilot operated valves, as used on vehicles, are normally actuated in response to pneumatic signals. It is essential that highly accurate test apparatus be used in determining the flow capacity, response time, and consistency from run to run of pilot operated valves. These valves must permit flow from zero to the high pressure very rapidly. In the testing of such valves, extremely accurate and consistent synchronization is needed in timing the operation of such valves from the initial application of pressure thereto. Through valves, such as quick release valves, require the same characteristics from the timing control valve used in a test set up as pilot operated valves, except that a relatively large volume of high pressure air must be instantly available. Thus, the timing control valve ordinarily mounted on a test stand must have a flow capacity in excess of that of any valve connected to it for testing, otherwise, accurate flow capacity data cannot be obtained for the valve under test.

It is an object of this invention to provide a valve that opens extremely rapidly, provides high flow capacity, and is useful in controlling an electrical circuit to determine the exact instant in which air flow from the valve begins. Another object is to use portions of a valve as conductors within an electrical circuit so that fluid movement through the valve can be accurately correlated with time. Another object is to construct the valves so that the elements are sealed at all times in closed position with such tightness as to be leak proof and to provide the positive contact necessary for conducting an electrical circuit through circuit interrupting elements.

SUMMARY OF THE INVENTION

The invention is embodied generally in a fluid valve wherein separable valve parts are electrical conductors which open and close an electrical circuit. Such a valve is exemplified by one comprising a hollow body providing a passageway for fluid therethrough terminating downstream in an outlet port. Normally, the body has an inlet port to the passageway and in any case has a valve seat element providing a seating surface for a poppet valve facing in the downstream direction of the passageway. A poppet valve is supported in the passageway for movements between open and closed positions with respect to the seating surface by support and guide means for the valve, such as a housing attached to the body with an electrically insulating material extending therebetween.

In the preferred form of the invention, the housing supports a latching mechanism consisting of an outer reciprocal latch ball follower associated with a push button or cap and an inner latch ball follower fixed to the valve, and latch balls supported within longitudinally spaced openings of a cylindrical wall of the housing whereby the outer follower may be manually operated to trip the valve to an open position. The valve is driven essentially by the fluid under pressure confined by the valve in its closed position.

The housing and all portions associated therewith for supporting the valve are electrically insulated from the body and valve seat of the valve by the insulating material named above. A circuit through the valve having one terminal associated with the housing and other valve support mechanism and another terminal associated with the body and valve seat in electrically connected relationship can be opened and closed by opening and closing of the poppet valve with respect to its seat in the body.

The above mentioned valve opens rapidly. Air flow goes from zero to full flow in an unusually short time. This occurs partly because of the large flow area within the valve and partly because of the combination of manual and pressure forces yielding high opening force and velocity of the valve element at time of opening. This valve provides electrical continuity within the valve whenever air flow is blocked, and circuit interruption at the precise instance air flow commences. No adjustment is ever required to synchronize the switch action with the commencement of air flow. This valve provides consistency in the air flow from one actuation to another because the valve elements are forced open by air pressure with circuit interruption occurring at the instant of valve element separation. As long as the supply pressure is constant, the valve response is uniform and completely uneffected by variations in the force and speed of manual actuation.

In a preferred embodiment, a floating valve seat is provided which may be acted on by the fluid at the upstream or pressure side of the valve. The floating valve seat enables the poppet valve to contact it squarely. The gap between the valve head and the seat is not critical since the seat travels with the valve head during opening until a stop engages the valve seat element. Such structure eliminates the need for any adjustments to maintain good operation.

BRIEF DESCRIPTION OF THE DRAWING

in FIG. 3, an intermediate stage of the valve in passing from closed to open position; and in FIG. 4, the open position of the valve.

DESCRIPTION OF THE PREFERRED EMBODIMENTS

Figure 1:
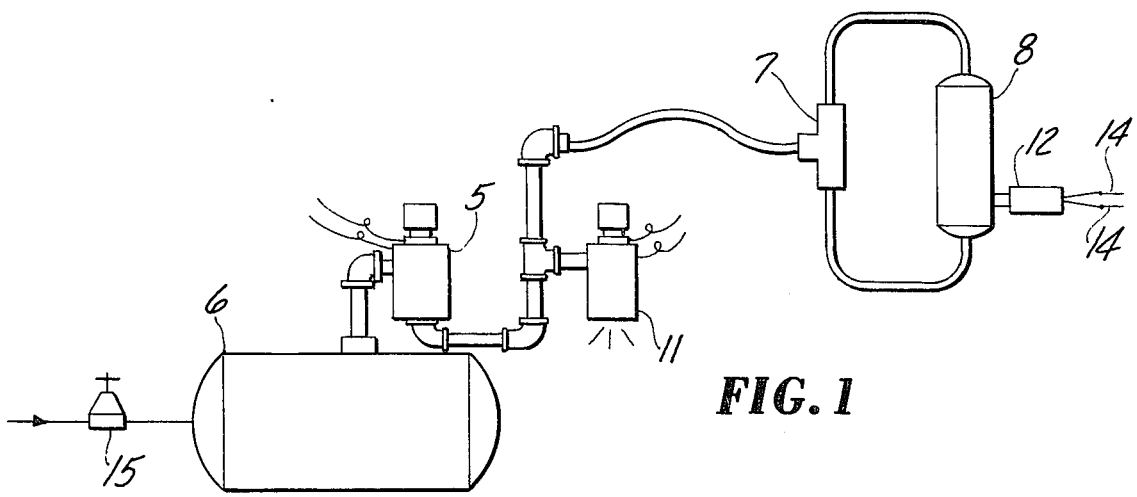
FIG. 1 is a diagrammatic view of test equipment utilizing the valve illustrated in FIGS. 2 to 5.

For illustration of the environment in which the invention may be used, FIG. 1 is a diagrammatic view showing the timing control valve 5 of this invention in an intermediate position between a pressure supply tank 6 and a component of a vehicle braking system under test, such as the valve 7. The valve 7 is shown connected with a standard volume exhaust tank 8 simulating the air capacity of air receiving brake devices on a vehicle. The supply tank 6 is preferably several fold larger than tank 8 to minimize pressure drop and to simulate charging conditions. Operation of the valve 5 charges the portion of the system including the valve 7 and the tank 8 with a standard volume of air which may be exhausted backwards through the valve 7 being tested under standard calibrated conditions through a valve 11 similar or identical to the valve 5. Pressure changes occurring in the tank 8 during charging or exhausting through the valve 7 are readily recorded through a pressure transducer 12 in fluid connection with the tank 8, and a device such as a recording oscillograph (not shown) connected with output wires 14 of the device 12. Standard pressure conditions are maintained in the tank 6 by a regulator 15.

Looking now to the main features of the invention, FIGS. 2 to 5 show that the valve 5 comprises a body 20 functioning primarily to provide a main passageway 21 through the valve terminating an inlet port 22, and in an outlet port 23 provided by a plug 25 secured within the passageway by a snap ring 26 capable of expanding into a groove of the body shown occupied by the ring. An essential function of the body is to support an annular metallic valve seat element 27 having its outer surface in slideable relation with the inner cylindrical surface 28 of the body. A compression spring 29 is seated against a spring seat ring 31 and a spring seat surface 32 of the element 27 facing inwardly of the body 20 for urging the element 27 toward an annular end surface 33 of the plug 25. The position of the ring 31 is fixed lengthwise of the passageway 21 by a snap ring 34 expanded into a groove along the inner surface 28 of the body. The seat element 27 is held away from the surface 33 during closed condition of the valve as shown in FIG. 1 by a poppet valve member 36 locked into this position by a latching mechanism to be described.

The valve member 36 comprising a head 36a and a stem 36b is supported in concentric relation with the valve seat element 27 in general by a housing 37 and other components associated therewith of the valve support and guide assembly. In the preferred form of the invention, the items of this assembly are in general of circular or annular shape arranged concentrically to the axis N—N of the valve. The housing 37, preferably of metal, has a radially outwardly extending flange 38 extending in radially overlapping relation with a radially inwardly extending flange 39 of the body 20. The flange 38 is positioned interiorly of the body adjacent the flange 39 with a cylindrical surface 41 of the body extending into close concentricity with the inner circumference 42 of the flange 39. Surfaces 41, 42 are separated by an annular spacer 43 of electrically non-conductive material. Flanges 38, 39 are separated by an annular sealing washer 44 of an electrically non-conductive material. To complete the attachment of the housing 37 to the body 20, a metallic collar 46 is secured to surface 47 of the housing 37 shown as a threaded extension of surface 41. The collar is separated from the end surface 48 of the body by a washer-like spacer 49 of electrically non-conductive material. The collar 46, shown in threaded relation with the housing, is tightened against the spacer and the flange 42 to place the housing 37 in firmly fixed relation with the body 20. It is important to note at this point that the housing 37 and all elements connected therewith are electrically insulated from the body 20 and all elements connected therewith.

Considering now valve components associated with the housing 37 for supporting and guiding the valve member 36, the flange or disc portion 38 of the housing has a central bore 51 which approximately matches the circumference of the cylindrical stem 36b of the valve closely enough to enable free sliding relation therebetween. A seal for the passageway 21 is established within the bore 51 between the body 20 and the housing 37 by an O-ring 52 which tends to hold the valve member in accurate concentric relation with the axis N—N and in guide relation with the housing 37. Further guide relation of the valve member with the housing is established by slideability of a sleeve 55 fixed to the stem 36b in concentric relation therewith with respect to a cylindrical wall 56 of the housing 37. The sleeve 55, of which a substantial portion of its length extends in concentric close-fitting relation with a portion of the exterior surface of the stem 36b is fixed to the valve stem by a pair of semi-circular stem-lock pieces 58, 59 which have portions in re-entrant relation with a groove 62 of the stem, and a plug 61 in threaded relation with an interior threaded bore of the sleeve. The stem 36b is urged in an axial direction within the sleeve by adjusting the plug 61 to tightly wedge pieces 58, 59 between the stem and the tapering bore portion 63.

Guide relation of the assembly comprising the valve member 36 and the sleeve 55 with the housing 37 is established between the cylindrical sleeve surface 66 and the interior housing wall surface 67, and also between the smaller diameter cylindrical surfaces 68, 69 of the sleeve and the housing, respectively. A spring 70 seated on an end surface 99 of the bore 69 and on a shoulder surface 71 of the sleeve urges the sleeve-valve assembly into seated engagement with the valve seat element 27. The spring 70 is of greater compressive strength than the spring 29 in order to enable the valve 36 to be positioned in a closed position by stop mechanism now to be described.

The valve member 36 is opened essentially by pressure stored upstream from the valve head 36a in the passageway 21 at closed condition of the valve. To restrain the member from opening movement in a direction toward the outlet port 23, the sleeve 55 is locked from axial movement relative to the wall 56 by four balls 72 shown in FIG. 2 occupying a circumferential groove 73 of the sleeve and an aperture 74 for each ball in the wall 56. The apertures 74 are located in one set of circumferentially spaced areas of the wall 56. Balls 72 are held in this position by an annular ridge 76 extending radially inwardly from the interior cylindrical surface 77a, 77b of a two-part shell consisting of circular shell portions 81, 82. It is to be noted that the cylindrical surface 77b extends axially into portion 82 sufficiently to accommodate four balls 83 at the position shown in FIG. 2. The wall 55 is provided with another set of four apertures 85 located within a second set of circumferentially spaced areas of the wall within which the balls 83 are received and laterally movable to dispose portions of the balls in excess of their diameters in either the cavity created exteriorly of the wall 55 by the shell surface 77b or partially within the groove 73 depending on the axial position of the shell. As shown, each aperture 74 and a corresponding aperture 83 are centered along a longitudinal line parallel to the valve stem axis.

Shell portions 81, 82 interlock with each other through axially and radially extending overlapping surfaces, as shown, and by a cap 88 having an interior threaded surface in threaded relation with an exterior threaded surface 89 of shell portion 82. Shell portion 81, having its end surface 91 received against the interior disc surface 92 of the cap, is in effect axially sandwiched between the cap and shell portion 82. A spring 93 seated by one end on a shoulder surface 94 of the housing, and at the other end on a recessed seating surface 95 of the shell portion 82 urges the assembly comprising shell portions 81, 82 and the cap 88 in a direction away from the body 20 until an inturned portion of the surface 77b engages balls 83. This condition establishes a position of the cap and shell assembly of FIG. 2 wherein the ridge 76 is located in radial alignment with the balls 72.

Figure 4:
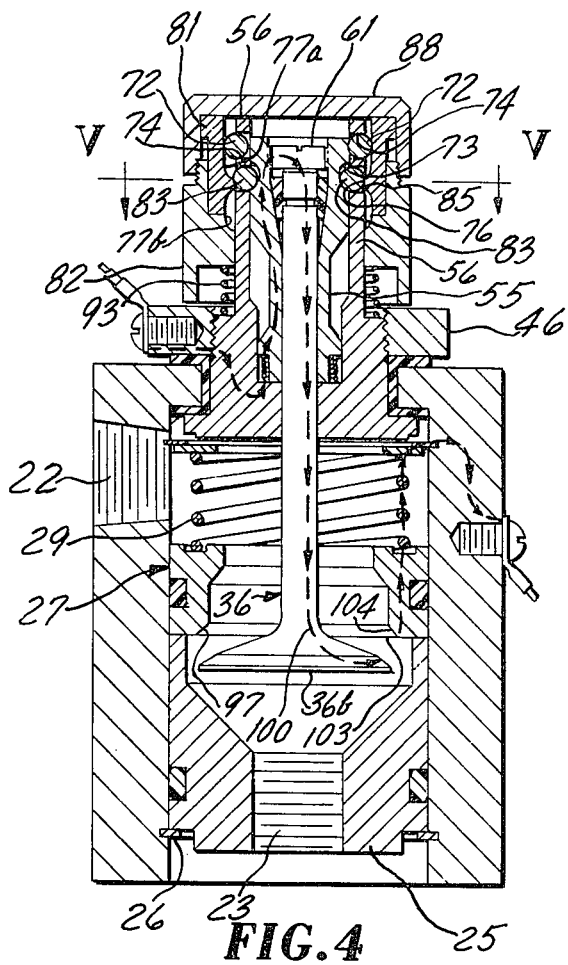
Figure 5:
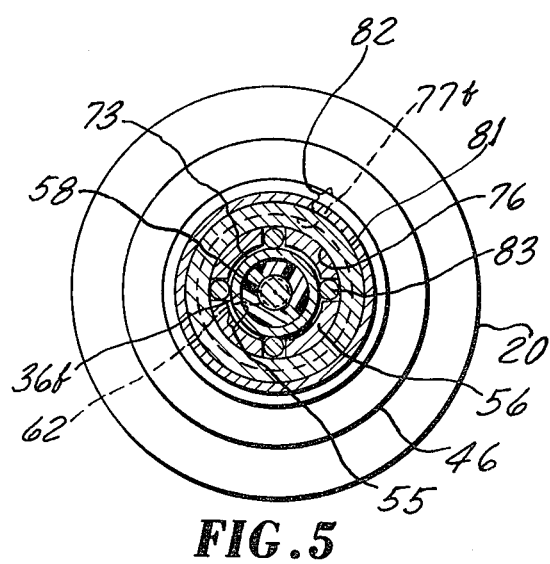
FIG. 5 is a view in diametral cross section taken along line V—V of FIG. 4.

Some dimensional relationships based on the common diameter of the balls 72 and 83 hereinafter referred to as $d$ or multiples of $d$, and the width of ridge 76 herein referred to as $w$ should be helpful in understanding the operation of the valve as shown in its closed position in FIG. 2 and in its open position in FIG. 4. First, it may be noted that the distance between the interior cap surface 92 and the end of the wall 56 is approximately $d+w$ and such end surface will act as a stop for the cap in the open position of FIG. 4. The spacer portion 37 of the wall 56 separating apertures 74 and 85 being $w$ in axial dimension, the length of the shell surface 77b including its concave or inturned end area is $3/2d + cW/2$ in order that the ridge 76 may travel from its position over one set of balls 72 in FIG. 2 to its valve open position of FIG. 4 over the other set of balls 83. Ball apertures 74, 85 may be regarded as approximately $1d$ in diameter.

To operate the valve 5, the cap 88 is merely pushed until surface 92 thereof seats on the end of wall 56. Such action will result in the condition shown in FIG. 4 wherein the ridge 76 is positioned flush with the outer cylindrical surface of the wall 56 over the apertures 85. The balls 83, at this position, have the excess of their diameters over the thickness of the wall 56 inserted into the groove 73 whereby the valve member 36 is axially entrapped in its open position and cannot move to narrow the distance away from its seat 97.

Figure 2:
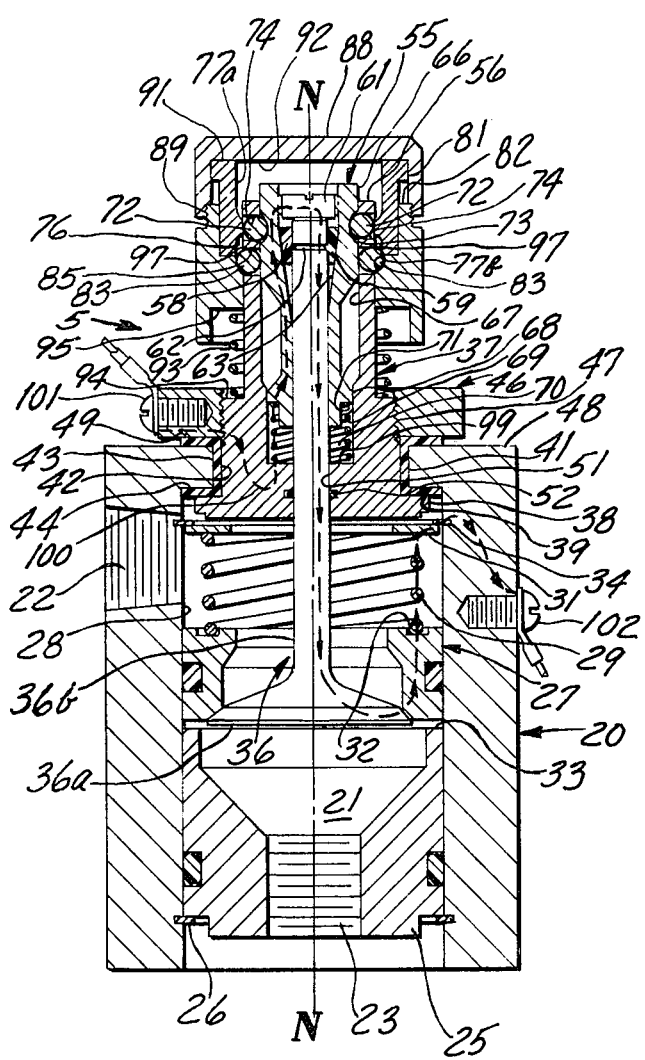
FIGS. 2, 3 and 4, are cross sectional elevations along a longitudinal axis of a valve in accordance with the invention illustrating in FIG. 2 the closed position.
Figure 3:
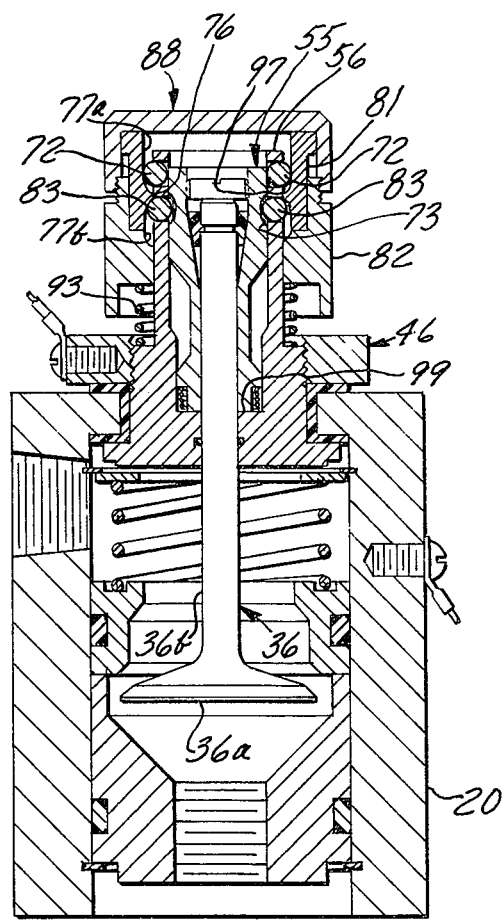

FIG. 3 illustrates an intermediate transitory position of the cap and shell assembly attained normally in a very small fraction of a second after movement of the position of FIG. 2. At this instant, the cap is in motion and the ridge 76 is radially opposite the spacer wall portion 97 with the surface defining the groove 73 having cammed the balls 72 radially outwardly into the region circumscribed by the shell surface 77a. During movement of the cap to the position of FIG. 3, the valve member 36 has been explosively propelled to its fully open position wherein the inner end of the sleeve 55 has engaged its stop surface 99. As the cap continues to move toward engagement of its surface 92 with the end surface of wall 56, the concave end area of surface 77b adjacent the ridge 76 cams the balls 83 into the groove 73.

When no pressure is exerted on the cap 88, springs 93 and 70 act simultaneously on the cap and shell assembly, and the sleeve and valve member assembly, respectively, to urge the assemblies axially away from the body 20 and restore the valve to the closed condition of FIG. 2. In doing so, the ridge 76 cams the balls 72 into the groove 73 as it arrives opposite the holes 74. In the axially outward travel of the sleeve valve assembly, the surface of the groove 73 cams the balls 83 radially outwardly toward and against the surface 77b.

Line 100 indicates generally a path that may be followed by an electrical circuit through the valve. In FIG. 2, path 100 is shown continuous between terminal 101 on the collar 46 and terminal 102 on the body 20. FIG. 4 shows the path broken by a gap 103 between the valve head 36b and the valve seat surface 104. Hence, the valve operates in an electrical circuit as a switch by the actual separation of the elements that control the flow of a fluid.

What is claimed is:

1. An electrical circuit controlling valve comprising:
   a hollow body providing a passageway for fluid therethrough extending in its downstream direction from an inlet port to an outlet port;
   valve seat means for a poppet valve member received in said body between said ports having its seating surface facing downstream of said passageway;
   a poppet valve member comprising a head and a stem;
   valve support and guide means in slidable engagement with said stem comprising electrically conductive means electrically connecting said valve and said support and guide means;
   said body and said valve seat means comprising electrically conductive means electrically connecting one to the other;
   means for attaching said body to said guide and support means to align said member for reciprocation effecting closed and opened positions of seating and spacing, respectively, of the head with respect to said seating surface;
   latching mechanism in said valve support and guide means interacting with said stem to retain and release said valve member;
   insulating means positioned between and separating said body and said support and guide means for preventing electrical connection thereof.

2. The valve of claim 1 wherein:
   said seating means is reciprocal within said passageway with its periphery in sealed relation with said body; and
   said valve comprises stop means within said body limiting movement of the valve seat means toward said outlet port;
   resilient means urging said valve seat means toward said stop means; and
   means for positioning said valve member in its closed position with said valve seat means retracted from said stop means, and in its open position with said valve seat means resting against said stop means.

3. The valve of claim 2 wherein said means for positioning the valve member comprises:
   a wall of said valve and guide means in radially spaced parallel relation with the longitudinal axis of said stem providing rectilinear radially outer and inner guide surfaces, said wall having first and second longitudinally spaced apertures extending therethrough, said first aperture being further away from said valve seat;
   a pair of latch balls received in said apertures and laterally slideable therewithin, said balls being of substantially greater diameter than the thickness of said wall;

an inner longitudinally reciprocable latch-ball follower secured to said stem and providing a rectilinear follower surface extending along said inner wall in guide relation therewith over said apertures and having a transverse groove of sufficient width to receive that portion of the diameter of either ball in excess of the wall thickness;

an outer longitudinally reciprocable latch-ball follower for entrapping said balls having a longitudinally rectilinear surface extending in parallel spaced relation with said outer wall surface interrupted by a transverse ridge extending radially inwardly into close clearance or slideable engagement with said wall, said rectilinear surface spaced from the wall to receive in the intervening space said portion of the excess diameter of either ball;

said followers and said wall being arranged with respect to the length of said axis to locate said ridge and said groove at opposite sides of said first aperture when said head is seated, and to locate said ridge and said groove at opposite sides of said second aperture when the head is in its maximum unseated position.

4. The valve of claim 1 wherein said valve support and guide means comprises:

an annular housing comprising an annular disc portion in radially overlapping relation with an end portion of said body and a cylindrical wall extending away from said body in concentric relation with the longitudinal axis of said stem, said wall having one set of circumferentially spaced areas, a set of first apertures, and in a second set of circumferentially spaced areas, a set of second apertures, the sets of apertures being spaced longitudinally along the wall and extending through said areas to establish the open and closed positions of the valve member, said first set of apertures being further away from said valve seat;

means attaching said body and said housing in coaxial relation with said insulating means disposed therebetween;

a latch ball received in each aperture and laterally slidable therewith, said balls being of substantially greater diameter than the thickness of said wall;

an annular sleeve fixed to, and surrounding said stem, and having a cylindrical surface in substantial sliding engagement with the inner surface of said wall, and having a circumferential groove in said cylindrical surface adapted to receive the excess of that portion of the diameter of any of said balls in excess of the wall thickness;

a two-part longitudinally reciprocable shell joining in axially overlapping portions and surrounding said wall areas to radially entrap said balls, said shell having an inner cylindrical surface concentric to the outer wall surface interrupted axially intermediately by a circular ridge extending radially inwardly from the cylindrical surface into substantial engagement with said wall, said cylindrical surface being spaced from the outer wall surface to receive that portion of the diameter of said balls in excess of the wall thickness;

a cap in threaded relation with the outer surface of a portion of said shell nearer the body having its inner disc surface in engagement with the end of the shell portion further from said body;

at closed position of said valve, said ridge being radially opposite said groove and the first of said holes to depress the balls of said first holes into said groove, said cap disc surface being axially spaced from the end of said wall a distance equal to the diameter of said balls and the width of said ridge;

at said open position of the valve, said cap disc surface engaging the end of said shell, and having moved axially approximately said distance from said closed position to dispose said ridge over the second holes to depress the balls in said sleeve groove;

a spring acting on said housing and said member to return the member to closed position;

a compression spring standing between seats therefor on said shell and said housing for urging the assembly of said cap and said shell away from said body; and electrical terminal means on said housing and said body.

5. The valve of claim 4 wherein:

said terminal means on the housing comprises an electrical collar surrounding a portion of said housing out of the movement range of said shell, said collar being secured to said housing and cooperating with said housing disc portion to entrap said radially extending portion of said body therebetween, said insulating means being located between all portions of said collar and said housing in bearing relation to said body;

said collar, said housing, said spring, said sleeve and said valve forming a continuous electrical conductor.

6. The valve of claim 4 wherein said body has an inner cylindrical cavity providing said passageway and comprises:

an annular plug centrally apertured to provide said outlet port and having an outer surface generally complementary to a section of said body inner surface, said plug terminating inwardly in an annular end surface adjacent the valve head when the valve is closed;

an annular valve seat element in complementary sliding engagement with the inner surface of said body supported by said valve head in axial clearance with said plug end surface at closed position of the valve; and a spring seat ring fixedly supported by said body at a clearance with said housing disc portion and in electrical connection with said body; a compression spring positioned in a state of compression between said ring and a circular surface of said valve seat element facing said ring.

* * * * *